United States Patent [19]

Citron et al.

[11] Patent Number: 4,771,117

[45] Date of Patent: Sep. 13, 1988

[54] POLYMERIZATION OF ACRYLIC ESTERS

[75] Inventors: Joel D. Citron; John A. Simms, both of Wilmington, Del.

[73] Assignee: E. I. Du Pont de Nemours and Company, Wilmington, Del.

[21] Appl. No.: 44,881

[22] Filed: Apr. 30, 1987

[51] Int. Cl.$^4$ ............................................. C08F 2/00
[52] U.S. Cl. .................................. 526/194; 526/329.7
[58] Field of Search ............................................. 526/194

[56] References Cited

U.S. PATENT DOCUMENTS

| | | | |
|---|---|---|---|
| 4,006,247 | 2/1977 | Panzer et al. | 526/194 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1986 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,711,942 | 12/1987 | Webster | 526/194 |

FOREIGN PATENT DOCUMENTS

| | | | |
|---|---|---|---|
| 60-23405 | 2/1985 | Japan | 526/194 |
| 60-76504 | 5/1985 | Japan | 526/194 |

OTHER PUBLICATIONS

J. Amer. Chem. Soc., 105, 5706 (1983), Webster et al.

*Primary Examiner*—Joseph L. Schofer
*Assistant Examiner*—N. Sarofim

[57] ABSTRACT

This invention relates to a process of polymerizing acrylic esters and, more specifically, to initiators which are useful therein.

31 Claims, No Drawings

POLYMERIZATION OF ACRYLIC ESTERS

BACKGROUND OF THE INVENTION

1. Field of the Invention

This invention relates to a process of polymerizing acrylic esters and, more specifically, to initiators which are useful therein.

2. Background

U.S. Pat. Nos. 4,414,372; 4,417,034; 4,508,880; 4,524,196; 4,581,428; 4,588,795; 4,598,161; 4,605,716; 4,622,372; 4,656,233; 4,681,918; and 4,711,942; and commonly assigned U.S. patent application Ser. No. 004,831 filed Jan. 13, 1987, referred to hereinafter as "the aforesaid patents and patent applications", disclose processes for polymerizing an acrylic or maleimide monomer to a "living" polymer in the presence of:

(i) an initiator having at least one initiating site and which is a tetracoordinate organo(Si, Sn or Ge) compound, including such compound having at least one oxygen, nitrogen or sulfur atom attached to the Si, Sn or Ge; and (ii) a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., "Group Transfer Polymerization—A New and Versatile Kind of Addition Polymerization", J. Am. Chem. Soc. 105, 5706 (1983)).

Additional details regarding Group Transfer Polymerization can be obtained from the aforesaid patents and patent applications, the disclosures of which are hereby incorporated by reference.

It is an object of this invention to provide additional silicon-containing compounds which are useful as initiators in acrylic ester polymerization. This and other objects will become apparent hereinafter.

DETAILED DESCRIPTION OF THE INVENTION

This invention resides in a polymerization process comprising contacting under polymerizing conditions:

(a) at least one acrylic ester monomer of the formula $CH_2=C(Y)C(O)OR$ wherein Y is $-H$ or $-CH_3$ and R is a hydrocarbyl radical;

(b) a polymerization initiator comprising a tetracoordinate silicon-containing organic compound having at least one initiating site; and (c) a catalyst which is a source of fluoride, bifluoride or selected oxyanions, the process characterized in that the initiator is of the formula

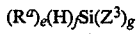

$(R^a)_e(H)_f Si(Z^3)_g$ wherein:

$Z^3$ is $-OR^b$, $-NR^bR^c$, $-Z^4Q^1$, $-Si(R^d)_3$ or $-Q^2$;
each $R^a$, independently, is hydrocarbyl;
$R^b$ is hydrocarbyl or $-Si(R^d)_h(H)_{3-h}$;
$R^c$ is H, alkyl, alkenyl, alkynyl or aralkyl;
$R^d$ is H or $C_{1-4}$ alkyl;
$Q^1$ is a saturated 5- or 6-membered ring;
$Z^4$ is O or $NR^d$;
$Q^2$ is 1H-imidazolyl, 4,5-dihydro-1H-imidazolyl (formerly imidazolinyl), 1H-pyrazolyl, or any one of said groups substituted with hydrocarbyl and/or fused to a carbocyclic ring;

each of e and f, independently, is 0 or an integer of 1 to 3;
g is 0 or an integer of 1 to 4;
(e+f+g) is 4; and
h is 1 or 2, provided, however, when $Z^3$ is:

(a)—$Z^4Q^1$ and $Z^4$ is $NR^d$, then g is 1;
(b)—$NR^bR^3$ wherein $R^c$ is H, then g is 1 or 2;
(c)—$NR^bR^c$ wherein $R^c$ is other than H, then g is 1 and $R^b$ is hydrocarbyl which is n-alkyl, n-alkenyl or n-alkynyl;
(d)—$NR^bR^c$ wherein $R^b$ is hydrocarbyl which is aryl, then $R^c$ is H and g is 1 or 2;
(e)—$NR^bR^c$ and Y in the monomer is $-CH_3$, then $R^b$ is non-aromatic hydrocarbyl; or
(f)—$OR^b$ wherein $R^b$ is hydrocarbyl, then $-OR^b$ is not attached to an aromatic ring, and provided, however, when Y in the monomer is:

(a)—$CH_3$, then $Z^4$ is O;
(b)—$CH_3$; $Z^3$ is $-OR^b$ or $-Z^4Q^1$ wherein $Z^4$ is O; and f is 0, then e is 3; or
(c)—$CH_3$; $Z^3$ is $-OR^b$ or $-Z^4Q^1$ wherein $Z^4$ is O; and f is not 0, then e is 1 or 2, and provided, however, when $Z^3$ is other than $-Q^2$, then the catalyst is the fluoride and/or bifluoride ion from the ammonium compound of the formula $(R')_j NH_{(4-j)}X$ wherein R' is hydrocarbyl, X is fluoride and/or bifluoride, and j is an integer of 2 to 4. Preferably, j is 4 and R' is n-butyl.

Preferably, $Q^2$ is neither substituted nor fused to a carbocyclic ring; $R^a$ is $C_{1-4}$ alkyl; $R^b$ is $C_{1-4}$ alkyl; $R^c$ is H or $C_{1-4}$ alkyl; $R^d$ is methyl; e is 1 to 3, more preferably 1 or 2; and f is 1 to 3. Most preferably, each of $R^a$, $R^b$ and $R^c$ is methyl; e is 1 or 2 and f is 1; e is 1 to 3, f is 1 to 3 and g is 0; or e is 1 or 2, f is 2 or 3 and g is 0.

By "a hydrocarbyl radical" or "hydrocarbyl" is meant a monovalent radical containing hydrogen and up to 30 carbon atoms and which may also contain, in addition to carbon and hydrogen atoms, one or more ether oxygen atoms within aliphatic segments thereof, and/or one or more functional substituents that are unreactive under polymerizing conditions.

Suitable catalysts for the polymerization reaction are selected from a source of fluoride or bifluoride ions, or mixture thereof, or a source of oxyanions, said oxyanions being capable of forming a conjugate acid having a pKa measured in water of about 3 to about 8. Among sources of fluoride or bifluoride ions, tetraalkylammonium salts are preferred; most preferred are tetra-n-butylammonium salts.

Acrylic ester monomers which are suitable for use in the practice of this invention are hydrocarbyl methacrylates and acrylates wherein hydrocarbyl is defined for R above. Such monomers include, but are not limited to, the following: methyl methacrylate; ethyl acrylate and methacrylate; butyl acrylate and methacrylate; sorbyl methacrylate and acrylate; 2-ethylhexyl methacrylate; 2-(dimethylamino)ethyl methacrylate and acrylate; 2-methoxyethyl methacrylate and acrylate; 3,3-dimethyloxypropyl acrylate; 3-methacryloxypropyl acrylate and methacrylate; 2-acetoxyethyl methacrylate; p-tolyl methacrylate; 2,2,3,3,4,4,4-heptafluorobutyl acrylate; 4-fluorophenyl acrylate; 2-methacryloxyethyl acrylate and linoleate; glycidyl methacrylate; phenyl acrylate; 2-[(1-propenyl)oxy]ethyl acrylate and methacrylate; 2-(trimethylsiloxy)ethyl methacrylate; allyl acrylate and methacrylate; unsaturated esters of polyols such as ethylene glycol dimethylacrylate and diacrylate; glyceryl triacrylate; triethylene glycol dimethacrylate; 1,4-cyclohexanediol diacrylate; 1,3-propanediol diacrylate; 1,1,1-trimethylolpropane triacrylate, 1,4-benzenediol dimethyacrylate; 3,3,4,4,5,5,6,6-nonafluorohexyl acrylate. Alkyl methacrylates and acrylates are preferred; methyl methacrylate and ethyl acrylate are most preferred.

The polymerization reaction ingredients should be free of hydroxylic-containing impurities, such as water, alcohols and carboxylic acids. However, some of the catalysts used in this invention may contain small amounts of water, which usually does not interfere to any extent with the polymerization. Solvents and monomers may be purified by any of a number of methods known to those skilled in the art, such as passage over activated alumina or molecular sieves, or by distillation.

By "polymerizing conditions" is meant that the polymerization is carried out at a temperature in the range of about −20° C. to 150° C., preferably from about 20° to about 120° C., with or without a solvent. A solvent such as tetrahydrofuran (THF) wherein all starting ingredients and products are soluble is preferred. The polymer may be isolated by any convenient means, such as by removal of solvent and excess monomer, if any, in a vacuum oven. The polymerization is preferably carried out under an inert atmosphere, such as nitrogen, to prevent ingress of hydroxylic compounds.

The initiator should be present at a concentration of about 0.1 to 5 mole percent of the monomer to be polymerized, preferably about 0.5 to 3 mole percent. The catalyst should be present at a concentration of about 0.2 to 20 mole percent of the initiator, preferably about 0.5 to 5 mole percent of the initiator.

Since it is believed that one molecule of initiator is necessary for each polymer chain (molecule) formed, the minimum amount of initiator needed will depend on the amount of monomer used and the number average molecular weight of the polymer produced. The molecular weight of the polymer produced is dependent on a number of factors, including but not necessarily limited to, the mode in which the reaction is run (batch, semibatch or continuous), the concentration of the various reactants, and the nature of the catalyst, monomer, solvent (if any) and initiator used. In general, during the reaction the molecular weight of the polymer gradually increases until it reaches a plateau ("steady state") at which point even though more polymer is being produced, the molecular weight does not change appreciably. In some of the embodiments of the invention, it has been found that the polymer molecular weight is inversely proportional to the catalyst concentration. The examples which are a part of this specification illustrate these principles.

As noted above, the polymerization can be carried out in a variety of ways, for example, batch (all ingredients present at the start of the polymerization), semibatch (the monomer is added continuously to all the other ingredients during the polymerization), or continuous (all the ingredients are added continuously). Other variations will be obvious to those skilled in the art. Some of the polymerizations carried out hereunder, mainly depending on the initiator used, may exhibit an "induction period", that is, a time period between the time the reactants are mixed and the time the polymerization begins. This period may be a few seconds to a few hours in length. The rate of polymerization also varies with the particular initiator and monomer used, as indicated above. These variations are illustrated in the examples.

The process of this invention provides an efficient and relatively low cost route to known and widely used polymers.

The following examples are intended to demonstrate, but not limit, the invention. Unless otherwise noted all temperatures are in degrees Centigrade. All solvents and monomers were first purified by passage over Woelm neutral activated alumina. All transfers of reagents were by syringe or other similar anhydrous method. Purified materials were stored and the reactions were carried out under nitrogen. All glassware except thermometers was heated at 155° C. overnight before use. Storage vessels and glassware associated with the reaction vessel were also flamed under nitrogen.

Abbreviations, and their definitions, used in the examples are as follows:

BDMS—bis(dimethylamino)methylsilane
GPC—gel permeation chromatography
$M_n$—number average molecular weight
$M_w$—weight average molecular weight
MMA—methyl methacrylate
EA—ethyl acrylate
PEA—poly(ethyl acrylate)
PMMA—poly(methyl methacrylae)
$TASHF_2$—a 1M solution of tris(dimethylamino)sulfonium bifluoride in acetonitrile
TBA—tetrabutylammonium
$TBAHF_2$—a 1M solution of tetrabutylammonium bifluoride in acetonitrile
TBAF—a 1M solution of tetrabutyammonium fluoride trihydrate in THF
THF—tetrahydrofuran
TMS—trimethylsilyl
TMSI—1-trimethylsilylimidazole With the exceptions noted below all compounds are commercially available. Silicon compounds (except ethyl orthosilicate) were obtained from Petrarch Systems Inc. of Bristol, Pa. The following compounds were synthesized by the exchange reaction of the corresponding imidazole of pyrazole with hexamethyldisilazane:

1-TMSbenzimidazole
  1-TMS-2-methylimidazole
  1-TMS-4-methylimidazole
  1-TMS-2-ethylimidazole
  1-TMS-3,5-dimethylpyrazole
  1-TMS-2-phenylimidazoline.

In many of the examples two general procedures, described below, were used. Exceptions to these procedures are noted in the individual examples.

PROCEDURE A

Reactions are carried out in a 250 mL, 3-necked round bottomed flask equipped with a rubber septum, thermometer, nitrogen inlet and magnetic stirring bar (Teflon encapsulated). One hundred mL of THF is added to the flask, and then 0.5 mL of initiator and the catalyst are added. Then 35 mL of MMA is added via syringe (and syringe pump) over 28 min. If the polymerization proceeds an exotherm occurs. There may also be an induction period. The reaction is allowed to stir for an additional 0.5–4 h and then 0.5–1.0 mL of methanol is added to stop further polymerization. A small sample is taken for GPC analysis, and the polymer is isolated by pouring the solution into a tray and putting it into a vacuum oven at 60°-70° to remove volatiles.

PROCEDURE B

A 50 mL Erlenmeyer flask is dried and then flamed with nitrogen with a rubber septum on top. The flask is vented to a nitrogen bubbler via a syringe needle. To the flask is added 20 mL of THF, 5 mL of monomer, the initiator and, finally, the catalyst. The resulting polymerization may or may not have an induction period. If the polymerization is very fast the flask contents may boil and the flask may be cooled briefly in cold water. After a total time of 1-5 h, methanol (0.5 mL) is added to stop the polymerization, a sample is taken for GPC analysis, and the solution is poured into a tared jar. The polymer is isolated by putting the jar in a 60°-70° vacuum oven to remove the volatiles.

EXAMPLES 1-6

These examples illustrate the polymerization of MMA by various substituted silylimidazoles and a silylpyrazole. Procedure A is followed for all except for certain MMA addition times which are: for Example 1, 48 min.; for Example 2, 50 min.; for Example 3, 49 min.; and for Example 5, 53 min. (including a 9 min. induction period). At the start of each polymerization 50 μL of TASHF$_2$ catalyst was present.

Examples 1 and 5 were heated to approximately 50° with a "heat gun" and two 50 μL portions of TASHF$_2$ were added to each during the reaction.

Other details of these examples are given in Table I.

TABLE I

| Example | Initiator (mL, except Ex. 1) | Yield PMMA, % | Mn | Mw |
|---|---|---|---|---|
| 1 | 1-TMS-benzimidazole (2.4 mmole) | 98 | 28,000 | 50,000 |
| 2 | 1-TMS-2-methyl-imidazole (0.43) | 100 | 29,100 | 58,000 |
| 3 | 1-TMS-2-ethyl-imidazole (0.47) | 100 | 32,200 | 61,000 |
| 4 | 1-TMS-4-methyl-imidazole (0.43) | 100 | 33,600 | 83,600 |
| 5 | 1-TMS-2-phenyl-imidazoline (0.61) | 91 | 25,600 | 91,000 |
| 6 | 1-TMS-3,5-dimethyl-pyrazole (0.39) | 100 | 31,000 | 84,000 |

EXAMPLE 7

The polymerization was carried out in the apparatus of Procedure A.

To the 250 mL flask was added 100 mL of THF, 0.39 mL of 1-trimethylsilylpyrazole, 50 μL of TASHF$_2$ and then, over 29 min., 20 mL of MMA, during which time the temperature rose from 23.5° to 44°. About 2.8 h later a sample (A) was withdrawn for GPC analysis. Then 15 mL of MMA was added over 21 min., during which time the temperature rose from 23.5° to 43°. About 2 h later a sample (B) was withdrawn for analysis and the polymer was isolated by removing volatiles in a 60° vacuum oven. The yield of polymer was 100%.

The two samples yielded the following GPC analyses:

| | A | B |
|---|---|---|
| Mn | 23,400 | 26,900 |
| Mw | 48,500 | 68,000 |

EXAMPLES 8-12

These examples were carried out according to procedure A except as noted in Table II. The actual addition time of the MMA was 54 min. In addition the pump was stopped after 5 mL of MMA was added, until the polymerization started; this ranged from 1-9 min. Samples were removed for analysis during the polymerization as noted in Table II and subjected to GPC analysis. The results are given in Table II.

These examples illustrate the effect of varying catalyst and initiator concentrations, as well as the leveling off of the polymer molecular weight as the polymerization proceeds.

TABLE II

| | Example | | | | |
|---|---|---|---|---|---|
| | 8[a] | 9[b] | 10 | 11 | 12 |
| mL TMSI | 0.43 | 0.43 | 0.43 | 0.43 | 0.22 |
| μL TASHF$_2$ | 1,000 | 500 | 250 | 100 | 100 |
| after 5 ml MMA added | | | | | |
| Mn | 10,700 | 18,400 | 18,000 | 16,600 | 23,400 |
| Mw | 22,400 | 39,800 | 45,800 | 36,800 | 66,000 |
| Mw/Mn | 2.09 | 2.16 | 2.54 | 2.21 | 2.82 |
| after 10 mL MMA added | | | | | |
| Mn | 5,220 | 11,800 | 18,500 | 29,700 | 33,900 |
| Mw | 13,600 | 27,000 | 49,000 | 67,100 | 78,000 |
| Mw/Mn | 2.61 | 2.29 | 2.64 | 2.26 | 2.30 |
| after 20 mL MMA added | | | | | |
| Mn | 5,730 | 12,700 | 24,000 | 34,700 | 39,300 |
| Mw | 13,200 | 24,500 | 59,000 | 79,000 | 85,900 |
| Mw/Mn | 2.30 | 1.92 | 2.08 | 2.30 | 2.18 |
| after 30 mL MMA added | | | | | |
| Mn | 5,220 | 13,700 | 25,300 | 35,800 | 38,500 |
| Mw | 45,900 | 26,500 | 50,600 | 81,500 | 85,700 |
| Mw/Mn | 8.79 | 1.93 | 2.00 | 2.28 | 2.23 |
| End of reaction | | | | | |
| Mn | 4,950 | 13,800 | 24,900 | 36,900 | 39,100 |
| Mw | 45,300 | 27,000 | 51,600 | 81,900 | 87,800 |
| Mw/Mn | 9.15 | 1.96 | 2.07 | 2.22 | 2.25 |
| Yield, % | 44 | 93 | 100 | 100 | 100 |

[a]Reaction seemed to stop and turn yellow after about 17 mL of MMA added
[b]Reaction seemed to stop very close to the end of the MMA addition

EXAMPLE 13

Using Procedure A, an MMA polymerization was carried out using 0.5 mL of 1-(t-butyldimethylsilyl)imidazole as initiator and 50 μL of TASHF$_2$ as catalyst. The 35 mL of MMA was added over 49 min., during which time the temperature rose from 23° to 45.5°. The yield of polymer was 100%. By GPC analysis, Mn is 41,500 and Mw is 92,700.

EXAMPLE 14

Using Procedure A, 0.5 mL of 1-(t-butyldimethylsilyl)imidazole was used as the initiator and 50 μL of TASHF$_2$ was used as the catalyst to polymerize 27 mL of EA. The EA was added over 38 min., during which time the temperature rose from 22.5° to 32.5°. Judging by the temperature, additional polymerization took place well after the addition was complete. The yield of PEA was 54%. GPC analysis indicated the Mn is 3,950, Mw is 10,200.

EXAMPLE 15

Using Procedure B, 0.1 mL of 1-TMSpyrazole was used as the initiator and 15 μL of TBAF was used as the catalyst to polymerize 5 mL of EA. The reaction was immediate and very exothermic. The yield of PEA was 71%. GPC analysis indicated the Mn is 5,690 and Mw is 11,300.

EXAMPLES 16-20

Using Procedure A, various TBA salts of oxyanions were used to polymerize MMA. The details are shown in Table III. TMSI (0.50 mL) was used as the initiator in each example, and the yield of PMMA in each was 100%.

TABLE III

| Example | Catalyst[a], M (μL) | Mn | Mw |
|---|---|---|---|
| 16 | TBA benzoate 1.0(50[b]) | 21,600 | 69,800 |
| 17[c] | TBA p-cyanobenzoate 0.5(200) | 52,700 | 101,000 |
| 18[c] | TBA m-chlorobenzoate 0.5(100[b]) | 50,200 | 93,000 |
| 19 | TBA biacetate 0.5(200) | 36,400 | 85,000 |
| 20 | TBA m-nitrophenolate 0.5(200) | nm | nm |

[a]All catalysts dissolved in acetonitrile
[b]An additional 50 μL portion added during polymerization
[c]Slow reaction; allowed to react overnight
nm—not measured

EXAMPLE 21

Using Procedure A, 26.5 mL of MMA was polymerized using 70 mL of TMSI as initiator and 50 μL of TASHF$_2$ as catalyst, in 100 mL of toluene as the solvent. The MMA was added over 37 min., during which time the temperature rose from 25° to 51°. The yield of PMMA was 90%, and GPC analysis indicated Mn 53,500 and Mw 120,000.

EXAMPLES 22-25

These examples illustrate the effect of varying the catalyst and initiator on molecular weight using BDMS as the initiator. All were carried out via Procedure A and all yields were about 100%.

TABLE IV

| | Example | | | |
|---|---|---|---|---|
| | 22 | 23 | 24 | 25 |
| μL TBAF | 100 | 500 | 100 | 100 |
| μL BDMS | 500 | 500 | 1,000 | 200 |
| After 15 mL MMA added | | | | |
| Mn | 44,600 | 13,500 | nm | 59,000 |
| Mw | 100,000 | 38,900 | nm | 118,000 |
| After 25 mL MMA added | | | | |
| Mn | 61,100 | 19,100 | nm | 60,800 |
| Mw | 133,000 | 54,400 | nm | 139,000 |
| After 35 mL MMA added (end) | | | | |
| Mn | 67,200 | 22,100 | 66,000 | 78,200 |
| Mw | 133,000 | 59,200 | 123,000 | 150,000 | nm—not measured

EXAMPLES 26-32

These examples, the details of which are in Table V, illustrate some of the silylamine initiators which can be used. In these examples, carried out via Procedure B, ethyl acrylate was the monomer, 15 μL of TBAF was the catalyst and 0.10 mL of each initiator, as shown in Table V, was used.

TABLE V

| Example | Initiator | Induction Time, min. | Yield PEA, % | Mn | Mw |
|---|---|---|---|---|---|
| 26 | BDMS | 0 | 91 | 17,300 | 43,100 |
| 27 | dimethylaminotrimethylsilane | 16 | 76 | 21,500 | 66,400 |
| 28 | bis(n-butylamino)-dimethylsilane | 1 | 67 | 19,400 | 56,400 |
| 29 | diethylaminodimethylsilane | 0 | 74 | 18,600 | 46,100 |
| 30 | N—TMSaniline | 0 | 63 | 12,000 | 31,000 |
| 31 | 1-TMSpyrrolidine | 6 | 59 | 18,300 | 55,000 |
| 32 | 1,1,3,3-tetramethyldisilazane | 0 | 69 | 15,200 | 39,100 |

EXAMPLE 33

Using Procedure B, MMA was polymerized using 0.1 mL of BDMS as initiator and 15 μL of TBAHF$_2$ as catalyst. After an induction period of about 7 min. the reaction proceeded slowly, yielding 72% PMMA having an Mn of 68,500 and an Mw of 308,000.

EXAMPLE 34

Using Procedure B, 0.1 mL of diethylaminodimethylsilane was used as the initiator and 15 μL of TBAF was used as the catalyst to polymerize MMA. Reaction was immediate. The resulting PMMA had an Mn of 60,900 and an Mw of 262,000.

EXAMPLES 35-42

These examples illustrate the polymerization of MMA (Examples 35-37) or EA (Examples 38-42) with various alkoxysilanes. Procedure B was used, with 0.10 mL of the initiator and 15 μL of TBAF as the catalyst. Details are given in Table VI.

TABLE VI

| Example | Initiator | Induction Time, min. | Polymer Yield, % | Mn | Mw |
|---|---|---|---|---|---|
| 35 | dimethylethoxysilane | 0 | 100 | 22,000 | 143,000 |
| 36 | trimethylmethoxysilane | >7 | >91 | 27,700 | 98,100 |
| 37 | 1,1,2,2,-tetramethyldisiloxane | 0 | 100 | 11,000 | 74,300 |
| 38[a] | dimethyldiethoxysilane | >5 | 78 | nm | nm |
| 39 | methyltrimethoxysilane | 4 | 74 | nm | nm |
| 40 | 1,1,2,2-tetramethyldisiloxane | 0 | 80 | nm | nm |
| 41[a] | tetramethoxysilane | >4 | 82 | nm | nm |
| 42 | trimethylmethoxysilane | 0 | 57 | nm | nm |

[a]Allowed to react overnight

EXAMPLE 43

Using Procedure B, 5 mL of MMA was polymerized using 0.1 mL of methyldiethoxysilane as the initiator and 15 μL of 1.0M TBAHF$_2$ in acetonitrile as the catalyst. The reaction started immediately and was very fast. A yield of 100% of PMMA was obtained, with an Mn of 51,800 and an Mw of 167,000.

EXAMPLES 44-47

These examples illustrate the effect of catalyst level on the polymerization using methyldimethoxy-silane as initiator. The reactions were carried out using Procedure A. In all the reactions 1.0 mL of initiator was used. Yields of PMMA were all 100% except Example 44 which was 91%. Samples were removed during and after the MMA addition and the results are shown in Table VII.

TABLE VII

|  | Example | | | |
|---|---|---|---|---|
|  | 44 | 45 | 46 | 47 |
| µL TBAHF$_2$ used | 25 | 50 | 100 | 250 |
| After 15 mL MMA added | | | | |
| Mn | 12,000 | 13,700 | 11,400 | 9,390 |
| Mw | 23,900 | 27,200 | 24,400 | 18,400 |
| After 25 mL MMA added | | | | |
| Mn | 14,300 | 14,300 | 13,900 | 11,800 |
| Mw | 32,800 | 29,100 | 28,100 | 24,600 |
| After 35 mL MMA added | | | | |
| Mn | 18,400 | 15,600 | 15,300 | 13,300 |
| Mw | 57,500 | 33,300 | 33,300 | 31,500 |

EXAMPLE 48

Using Procedure A, 35 mL of MMA was polymerized using 0.50 mL of triethylsilane as the initiator and 100 µL of TBAF as the catalyst. The MMA addition was stopped for 10 min. after 15 mL of MMA had been added, until the reaction started (induction period). Samples were removed during the addition and analyzed (below). The yield of PMMA was 100%.

| mL of MMA added | 15 | 25 | 35 |
|---|---|---|---|
| Mn | 32,300 | 23,100 | 25,400 |
| Mw | 133,000 | 97,400 | 88,000 |

EXAMPLES 49-51

These examples illustrate the use of various silanes as initiators. In each reaction, carried out via Procedure B, 0.1 mL of the initiator and 15 µL of the indicated catalyst (TBAF in Examples 49, 51; TBAHF$_2$ in Example 50) were used. MMA was the monomer in Examples 49, 50; EA, in Example 51. Details are given in Table VIII.

TABLE VIII

| Example | Initiator | Polymer Yield, % | Mn | Mw |
|---|---|---|---|---|
| 49 | methylphenylsilane | 97 | 27,800 | 115,000 |
| 50 | n-octadecylsilane | 93 | 42,200 | 181,000 |
| 51 | methylphenylsilane | 82 | 10,500 | 23,000 |

EXAMPLE 52

Using Procedure B, 0.10 mL of hexamethyldisilane as initiator and 15 µL of TBAF as catalyst, 5 mL of MMA was polymerized. The reaction had at least a 7 min. induction time and proceeded slowly over about one hour. The yield of PMMA was 92%, having an Mn of 30,300 and an Mw of 194,000.

EXAMPLE 53

Using Procedure B, 0.1 mL of hexamethyldisilane was used as the initiator and 15 µL of TBAF was used as the catalyst to polymerize 5 mL of EA. The reaction was allowed to stand overnight, after which the PEA was isolated. The yield of PEA was 29%, with an Mn of 6,020 and an Mw of 14,700.

We claim:

1. Polymerization process comprising contacting under polymerizing conditions:
   (a) at least one acrylic ester monomer of the formula $CH_2=C(Y)C(O)OR$ wherein Y is —H or —CH$_3$ and R is a hydrocarbyl radical;
   (b) a polymerization initiator comprising a tetracoordiate silicon-containing organic compound having at least one initiating site; and
   (c) a catalyst which is a source of fluoride, bifluoride or selected oxyanions, the process characterized in that the initiator is of the formula

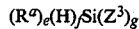

$$(R^a)_e(H)_f Si(Z^3)_g$$

wherein:

$Z^3$ is —OR$^b$, —NR$^b$R$^c$, —Z$^4$Q$^1$, —Si(R$^d$)$_3$ or —Q$^2$;

each R$^a$, independently, is hydrocarbyl;

R$^b$ is hydrocarbyl or —Si(R$^d$)$_h$(H)$_{3-h}$;

R$^c$ is H, alkyl, alkenyl, alkynyl or aralkyl;

R$^d$ is H or C$_{1-4}$ alkyl;

Q$^1$ is a saturated 5- or 6-membered ring;

Z$^4$ is O or NR$^d$;

Q$^2$ is 1H-imidazolyl, 4,5-dihydro-1H-imidazolyl (formerly imidazolinyl), 1H-pyrazolyl, or any of said groups substituted with hydrocarbyl and/or fused to a carbocyclic ring;

each of e and f, independently, is 0 or an integer of 1 to 3;

g is 0 or an integer of 1 to 4;

(e+f+g) is 4; and h is 1 or 2, provided, however, when Z$^3$ is:
(a) —Z$^4$Q$^1$ and Z$^4$ is NR$^d$, then g is 1;
(b) —NR$^b$R$^c$ wherein R$^c$ is H, then g is 1 or 2;
(c) —NR$^b$R$^c$ wherein R$^c$ is other than H, then g is 1 and R$^b$ is hydrocarbyl which is n-alkyl, n-alkenyl or n-alkynyl;
(d) —NR$^b$R$^c$ wherein R$^b$ is hydrocarbyl which is aryl, then R$^c$ is H and g is 1 or 2;
(e) —NR$^b$R$^c$ and Y in the monomer is —CH$_3$, then R$^b$ is non-aromatic hydrocarbyl; or
(f) —OR$^b$ wherein R$^b$ is hydrocarbyl, then —OR$^b$ is not attached to an aromatic ring, and provided, however, when Y in the monomer is:
(a) —CH$_3$, then Z$^4$ is O;
(b) —CH$_3$, Z$^3$ is —OR$^b$ or —Z$^4$Q$^1$ wherein Z$^4$ is O; and f is 0, then e is 3; or
(c) —CH$_3$; Z$^3$ is —OR$^b$ or —Z$^4$Q$^1$ wherein Z$^4$ is O; and f is not 0, then e is 1 or 2, and provided, however, when Z$^3$ is other than —Q$^2$, then the catalyst is the fluoride or bifluoride ion from the ammonium compound of the formula (R')$_j$NH$_{(4-j)}$X wherein R' is hydrocarbyl, X is fluoride and/or bifluoride, and j is an integer of 2 to 4.

2. Process of claim 1 wherein each of R$^a$ and R$^b$, independently, is C$_{1-4}$ alkyl.

3. Process of claim 2 wherein each of R$^a$ and R$^b$ is methyl.

4. Process of claim 1 wherein each of R$^c$ and R$^d$, independently, is H or C$_{1-4}$ alkyl.

5. Process of claim 3 wherein each of $R^c$ and $R^d$ is H or methyl.

6. Process of claim 4 wherein each of $R^c$ and $R^d$ is H or methyl.

7. Process of claim 1 wherein each of e and f, independently, is 1 to 3.

8. Process of claim 7 wherein each of e and f is 1 or 2.

9. Process of claim 8 wherein e is 2, f is 1 and $R^a$ is methyl.

10. Process of claim 8 wherein e is 1, f is 1 and $R^a$ is methyl.

11. Process of claim 7 wherein e is 1 or 2 and f is 2 or 3.

12. Process of claim 1 wherein $Z^3$ is $-Q^2$.

13. Process of claim 12 wherein $Q^2$ is unsubstituted or substituted with at least one alkyl or phenyl group.

14. Process of claim 13 wherein e is 3, g is 1 and $R^a$ is methyl.

15. Process of claim 1 wherein $Z^3$ is $-NR^bR^c$ and each of $R^b$ and $R^c$, independently, is $C_{1-4}$ alkyl.

16. Process of claim 2 wherein $Z^3$ is $-OR^b$ and g is at least 1.

17. Process of claim 1 wherein R in the monomer is $C_{1-4}$ alkyl.

18. Process of claim 1 wherein the initiator concentration is 0.5 to 3 mol% of the monomer concentration.

19. Process of claim 1 wherein the catalyst concentration is 0.5 to 5% of the initiator concentration.

20. Process of claim 19 wherein the catalyst is a source of fluoride or bifluoride ions.

21. Process of claim 1 wherein $Z^3$ is other than $-Q^2$ and the catalyst is a tetraalkylammonium fluoride and/or bifluoride.

22. Process of claim 21 wherein alkyl is n-butyl.

23. Process of claim 1 wherein a solvent is employed.

24. Process of claim 1 wherein the temperature is in the range of about 20° to about 120° C.

25. Process of claim 1 wherein R and Y are methyl.

26. Process of claim 1 wherein R is ethyl and Y is H.

27. Process of claim 9 wherein $Z^3$ is $-OR^b$ or $-NR^bR^c$ and $R^b$ and $R^c$ are methyl.

28. Process of claim 10 wherein $Z^3$ is $-OR^b$ or $-NR^bR^c$ and $R^b$ and $R^c$ are methyl.

29. Process of claim 1 wherein e is 1 or 2, f is 2 or 3 and g is 0.

30. Process of claim 18 wherein the catalyst concentration is 0.5 to 5% of the initiator concentration.

31. Process of claim 1 wherein $Z^3$ is $-Q^2$ and the catalyst is a tetraalkylammonium salt of a selected oxyanion.

* * * * *